United States Patent
Anderson

[11] Patent Number: 6,145,813
[45] Date of Patent: Nov. 14, 2000

[54] MANUAL VEHICLE JACK ASSEMBLY

[76] Inventor: Marcus W. Anderson, 18539 W. 8 Mile, Detroit, Mich. 48219

[21] Appl. No.: 09/160,158

[22] Filed: Sep. 25, 1998

[51] Int. Cl.[7] .................................................. B60S 9/02
[52] U.S. Cl. ........................... 254/418; 254/420; 254/419
[58] Field of Search .................................. 254/418, 419, 254/420

[56] References Cited

U.S. PATENT DOCUMENTS

| | | | |
|---|---|---|---|
| 2,451,408 | 10/1948 | Paolucci | 254/418 |
| 3,024,870 | 3/1962 | Kramcsak, Jr. et al. | 254/418 |
| 3,614,064 | 10/1971 | Bennett | 254/418 |
| 3,863,894 | 2/1975 | Mansi et al. | 254/420 |
| 4,084,789 | 4/1978 | Francis | 254/418 |

*Primary Examiner*—David A. Scherbel
*Assistant Examiner*—Lee Wilson

[57] ABSTRACT

A vehicular jack system is provided including a mounting bracket fixedly coupled to a frame of a vehicle. Also included is a jack assembly connected to the mounting bracket for elevating the vehicle. A jack arm is provided for manually elevating the vehicle via the jack assembly by way of a reciprocating motion.

17 Claims, 2 Drawing Sheets

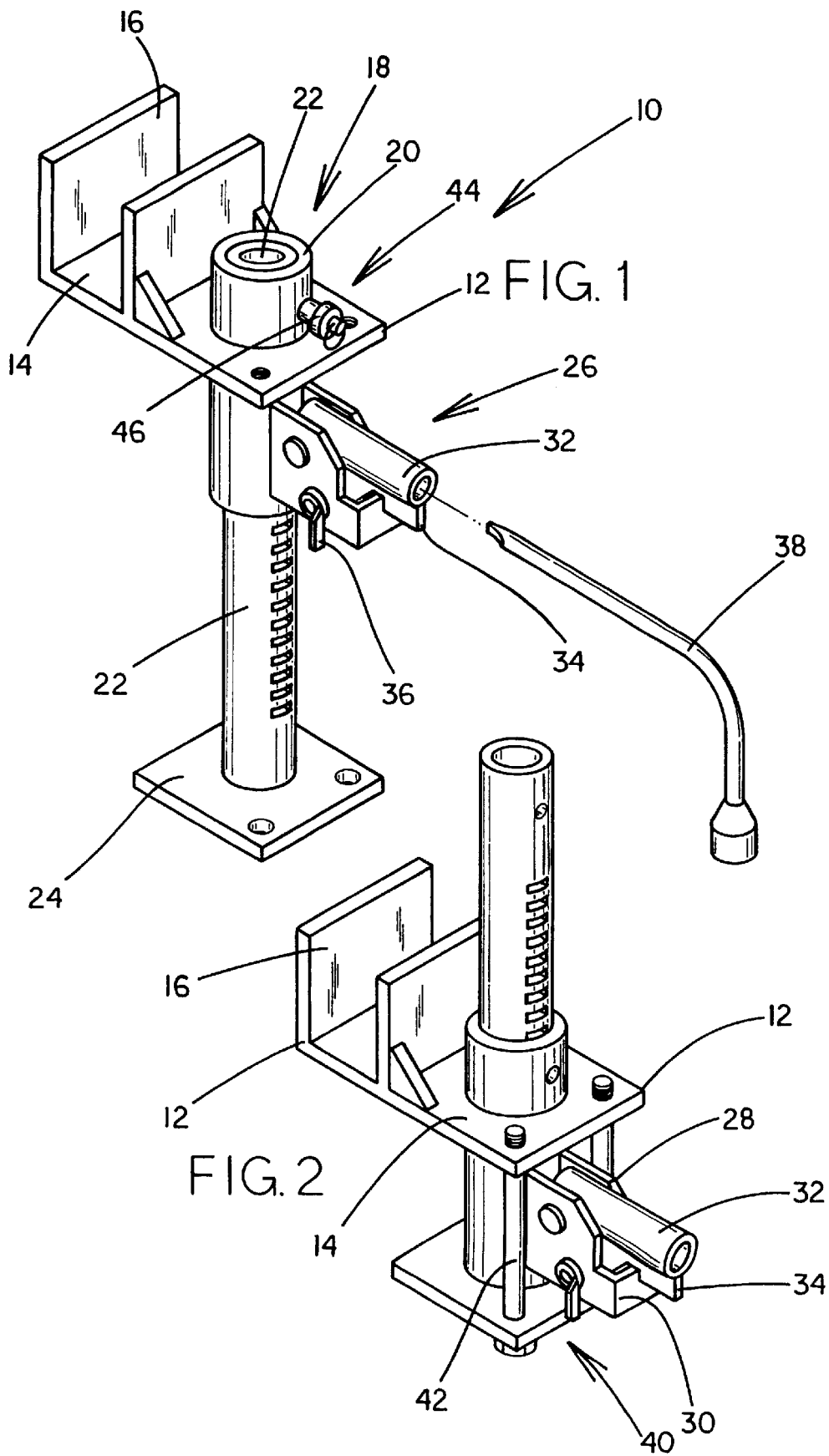

MANUAL VEHICLE JACK ASSEMBLY

BACKGROUND OF THE INVENTION

1. Field of the Invention

The present invention relates to vehicular jacks and more particularly pertains to a new manual vehicle jack assembly for conveniently raising and lowering a vehicle with a permanently attached manual jack so as to change a tire.

2. Description of the Prior Art

The use of vehicular jacks is known in the prior art. More specifically, vehicular jacks heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicular jacks include U.S. Pat. No. 4,084,789; U.S. Pat. No. 5,377,957; U.S. Pat. No. 5,219,429; U.S. Pat. No. 5,232,206; U.S. Pat. No. 4,993,688; and U.S. Pat. No. Des. 348,966.

In these respects, the manual vehicle jack assembly according to the present invention substantially departs from the conventional concepts and designs of the prior art, and in so doing provides an apparatus primarily developed for the purpose of conveniently raising and lowering a vehicle with a permanently attached manual jack so as to change a tire.

SUMMARY OF THE INVENTION

In view of the foregoing disadvantages inherent in the known types of vehicular jacks now present in the prior art, the present invention provides a new manual vehicle jack assembly construction wherein the same can be utilized for conveniently raising and lowering a vehicle with a permanently attached manual jack so as to change a tire.

The general purpose of the present invention, which will be described subsequently in greater detail, is to provide a new manual vehicle jack assembly apparatus and method which has many of the advantages of the vehicular jacks mentioned heretofore and many novel features that result in a new manual vehicle jack assembly which is not anticipated, rendered obvious, suggested, or even implied by any of the prior art vehicular jacks, either alone or in any combination thereof.

To attain this, the present invention generally comprises a mounting bracket having a planar rectangular horizontal plate. Such horizontal plate is equipped with a periphery defined by a short inboard edge, a short outboard edge and a pair of elongated parallel side edges. The mounting bracket further has a pair of vertical plates including a first vertical plate integrally coupled along the inboard edge of the horizontal plate and extending upwardly therefrom in perpendicular relationship therewith. Associated therewith is a second vertical plate integrally coupled along a center line of the horizontal plate and extending upwardly therefrom in perpendicular relationship therewith. By this structure, a slot is defined for receiving a longitudinal frame bar of a vehicle. Preferably, the mounting bracket is permanently attached to the frame bar via a plurality of screws. Next provided is a jack assembly including a vertically oriented cylindrical tube mounted to the horizontal plate of the mounting bracket between the outboard edge and the center line thereof. The cylindrical tube extends both above and below the horizontal plate of the mounting bracket to define an upper extent and a lower extent. The jack assembly further includes an elevation cylinder slidably situated within the cylindrical tube. As shown in the Figures, a planar square base is mounted to a lower end of the elevation cylinder. The elevation cylinder has a plurality of vertically spaced notches formed therein for reasons that will soon become apparent. The jack assembly further includes a control mechanism having a housing coupled to the lower extent of the cylindrical tube and extending radially therefrom. As shown in FIGS. 3 & 4, the housing extends past the outboard edge of the horizontal plate of the mounting bracket. Further, the housing has an open top and an upwardly extending outboard lip. The control mechanism of the jack assembly further includes a sleeve pivotally coupled at an inboard end thereof within the housing about a horizontal axis. As shown in FIGS. 1 & 2, the sleeve has a vertical tab coupled to a bottom end thereof with a notch formed therein. Such notches serves for removably receiving the upwardly extending outboard lip when in a lowered orientation. In use, the elevation cylinder is adapted to raise and lower upon the reciprocation of the sleeve thereby elevating the vehicle. Also included is a jack arm having an L-shaped configuration. The jack is equipped with a first end with a tapered configuration and a second end with a socket mounted thereon. In operation, the first end of the jack arm is adapted to be removably situated within an outboard end of the sleeve for manually reciprocating the same. FIGS. 1 & 2 best show a storage locking assembly for maintaining the elevation cylinder in an upwardly extended orientation for storage purposes. The storage locking assembly includes a first pair of vertical bores formed in the horizontal plate of the mounting bracket adjacent ends of the outboard edge thereof. Associated therewith is a second pair of bores formed in the base of the elevation cylinder of the jack assembly adjacent ends of an outboard edge thereof. Coupled within the first and second pair of bores is a pair of bolts. Each bolt has a length about equal to a height of the bottom extent of the cylindrical tube of the jack assembly for maintaining the elevation cylinder in the upwardly extended orientation. Finally, a deployed locking assembly is provided including a first aperture formed in the elevation cylinder of the jack assembly at a top end thereof. A second aperture is formed in the upper extent of cylindrical tube of the jack assembly adjacent to a top end thereof. A quick release pin is removably situated within the first and second apertures. As such, the pin maintains the elevation cylinder in a downwardly extended orientation during deployment.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new manual vehicle jack assembly apparatus and method which has many of the advantages of the vehicle jacks mentioned heretofore and many novel features that result in a new manual vehicle jack assembly which is not anticipated, rendered obvious, suggested, or even implied by any of the prior art vehicle jacks, either alone or in any combination thereof.

It is another object of the present invention to provide a new manual vehicle jack assembly which may be easily and efficiently manufactured and marketed.

It is a further object of the present invention to provide a new manual vehicle jack assembly which is of a durable and reliable construction.

An even further object of the present invention is to provide a new manual vehicle jack assembly which is susceptible of a low cost of manufacture with regard to both materials and labor, and which accordingly is then susceptible of low prices of sale to the consuming public, thereby making such manual vehicle jack assembly economically available to the buying public.

Still yet another object of the present invention is to provide a new manual vehicle jack assembly which provides in the apparatuses and methods of the prior art some of the advantages thereof, while simultaneously overcoming some of the disadvantages normally associated therewith.

Still another object of the present invention is to provide a new manual vehicle jack assembly for conveniently raising and lowering a vehicle with a permanently attached manual jack so as to change a tire.

Even still another object of the present invention is to provide a new manual vehicle jack assembly that includes a mounting bracket fixedly coupled to a frame of a vehicle. Also included is a jack assembly connected to the mounting bracket for elevating the vehicle. A jack arm is provided for manually elevating the vehicle via the jack assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new manual vehicle jack assembly according to the present invention.

FIG. 2 is a perspective view of the present invention when not in use.

DESCRIPTION OF THE PREFERRED EMBODIMENT

Figure 3:
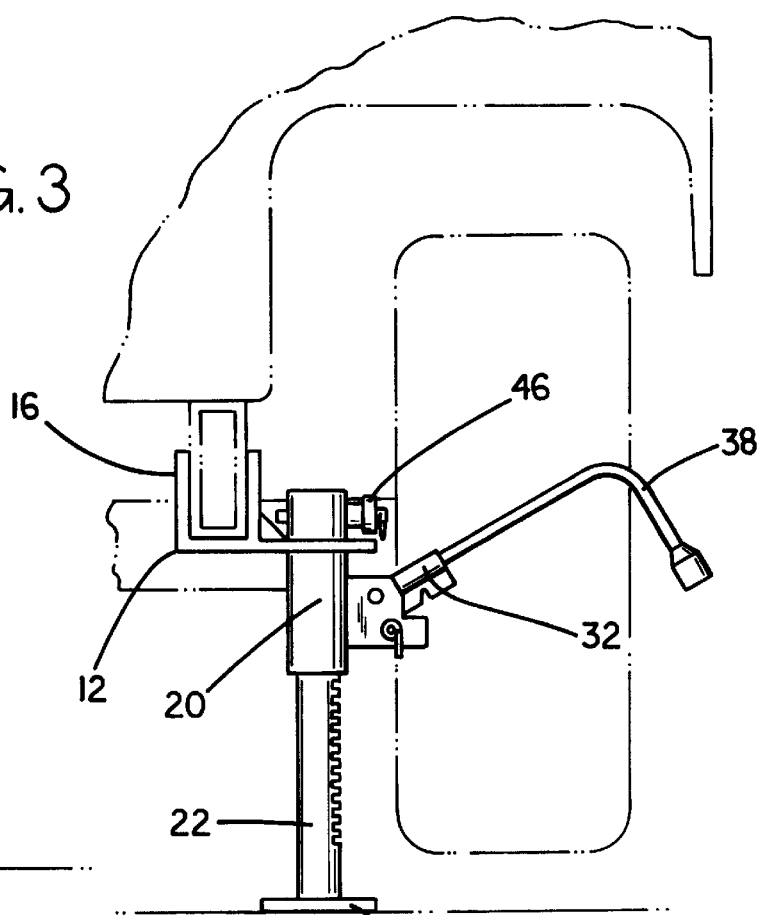
FIG. 3 is a front view of the present invention in its deployed orientation.

With reference now to the drawings, and in particular to FIGS. 1 through 4 thereof, a new manual vehicle jack assembly embodying the principles and concepts of the present invention and generally designated by the reference numeral 10 will be described.

The present invention, designated as numeral 10, includes a mounting bracket 12 having a planar rectangular horizontal plate 14. Such horizontal plate is equipped with a periphery defined by a short inboard edge, a short outboard edge and a pair of elongated parallel side edges.

The mounting bracket further has a pair of vertical plates 16 including a first vertical plate integrally coupled along the inboard edge of the horizontal plate and extending upwardly therefrom in perpendicular relationship therewith. Also included is a second vertical plate integrally coupled along a center line of the horizontal plate and extending upwardly therefrom in perpendicular relationship therewith. The second vertical plate is preferably supported by triangular braces which are mounted to the horizontal plate. By this structure, a slot is defined for receiving a longitudinal frame bar of a vehicle. Preferably, the mounting bracket is permanently attached to the frame bar via a plurality of unillustrated screws. Alternate methods of permanent attachment may also be employed such as a weld or the like.

Next provided is a jack assembly 18 including a vertically oriented cylindrical tube 20 mounted to the horizontal plate of the mounting bracket between the outboard edge and the center line thereof. As such, the jack assembly is laterally offset from the vertical plates of the mounting bracket. The cylindrical tube extends both above and below the horizontal plate of the mounting bracket to define an upper extent and a lower extent. As shown in the Figures, the lower extent has a height of at least twice that of the upper extent.

The jack assembly further includes an elevation cylinder 22 slidably situated within the cylindrical tube. A height of the elevation cylinder is at least twice that of the elevation cylinder. As shown in the Figures, a planar square base 24 is mounted to a lower end of the elevation cylinder. The elevation cylinder has a plurality of vertically spaced notches formed therein for reasons that will soon become apparent.

Figure 4:
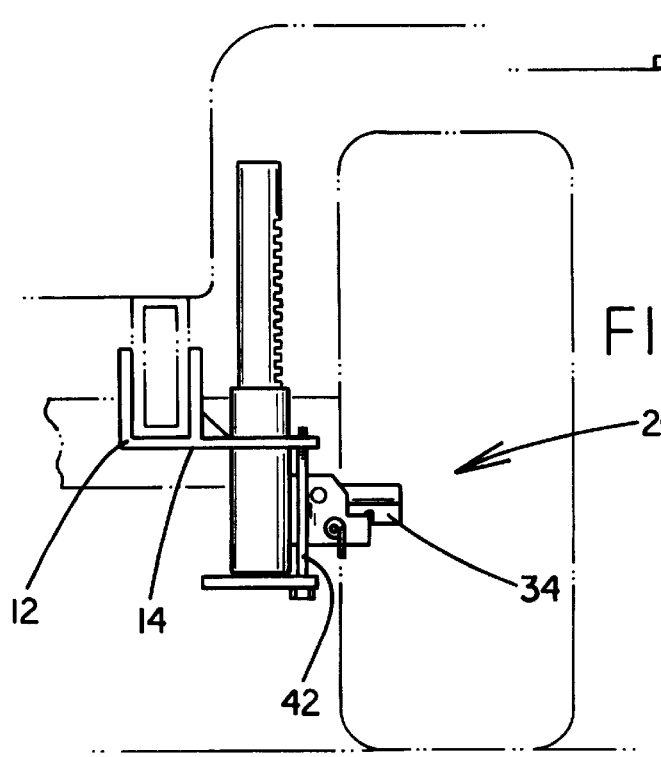
FIG. 4 is a front view of the present invention in its stored orientation.

The jack assembly further includes a control mechanism 26 having a housing 28 coupled to the lower extent of the cylindrical tube and extending radially therefrom. As shown in FIGS. 3 & 4, the housing extends past the outboard edge of the horizontal plate of the mounting bracket. Further, the housing has an open top and an upwardly extending outboard lip 30.

The control mechanism of the jack assembly further includes a sleeve 32 pivotally coupled at an inboard end thereof within the housing about a horizontal axis. Lengths of the sleeve and the housing of the control mechanism are preferably similar. As shown in FIGS. 1 & 2, the sleeve has a vertical tab 34 coupled to a bottom end thereof with a notch formed therein. Such notches serves for removably receiving the upwardly extending outboard lip when in a lowered orientation. In use, the elevation cylinder is adapted to raise and lower upon the reciprocation of the sleeve thereby elevating the vehicle. It should be noted that this is accomplished by a ratchet type mechanism which is commonly known. To control whether the reciprocating pumping action effects raising or lowering of the elevation cylinder, a toggle switch 36 is provided.

Also included is a jack arm 38 having an L-shaped configuration. The jack is equipped with a first end with a tapered configuration and a second end with a socket mounted thereon. In operation, the first end of the jack arm is adapted to be removably situated within an outboard end of the sleeve for manually reciprocating the same.

FIGS. 1 & 2 best show a storage locking assembly 40 for maintaining the elevation cylinder in an upwardly extended orientation for storage purposes. The storage locking assembly includes a first pair of vertical threaded bores formed in the horizontal plate of the mounting bracket adjacent ends of the outboard edge thereof. Associated therewith is a second pair of bores formed in the base of the elevation cylinder of the jack assembly adjacent ends of an outboard edge thereof. Coupled within the first and second pair of bores is a pair of bolts 42. Each bolt has a length about equal to a height of the bottom extent of the cylindrical tube of the jack assembly for maintaining the elevation cylinder in the upwardly extended orientation.

Finally, a deployed locking assembly 44 is provided including a first aperture formed in the elevation cylinder of the jack assembly at a top end thereof. A second aperture is formed in the upper extent of cylindrical tube of the jack assembly adjacent to a top end thereof. It is preferred that the apertures face the outboard edge of the horizontal plate of the mounting bracket. A quick release pin 46 is removably situated within the first and second apertures. As such, the pin maintains the elevation cylinder in a downwardly extended orientation during deployment. It should be noted that the present invention is permanently installed adjacent to each of the wheels of a vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular jack system comprising, in combination:
   a mounting bracket including a planar rectangular horizontal plate with a periphery defined by a short inboard edge, a short outboard edge and a pair of elongated parallel side edges, the mounting bracket further including a pair of vertical plates including a first vertical plate integrally coupled along the inboard edge of the horizontal plate and extending upwardly therefrom in perpendicular relationship therewith and a second vertical plate integrally coupled along a center line of the horizontal plate and extending upwardly therefrom in perpendicular relationship therewith, thereby defining a slot for receiving a longitudinal frame bar of a vehicle, wherein the mounting bracket is permanently attached to the frame bar via a plurality of screws;
   a jack assembly including a vertically oriented cylindrical tube mounted to the horizontal plate of the mounting bracket between the outboard edge and the center line thereof such that the cylindrical tube extends both above and below the horizontal plate of the mounting bracket to define an upper extent and a lower extent, the jack assembly further including an elevation cylinder slidably situated within the cylindrical tube and having a planar square base mounted to a lower end thereof, the elevation cylinder having a plurality of vertically spaced notches formed therein, the jack assembly including a control mechanism including a housing coupled to the lower extent of the cylindrical tube and extending radially therefrom past the outboard edge of the horizontal plate of the mounting bracket, the housing having an open top and an upwardly extending outboard lip, the control mechanism further including a sleeve with an inboard end pivotally coupled within the housing about a horizontal axis wherein the sleeve has a vertical tab coupled to a bottom end thereof with a notch formed therein for removably receiving the upwardly extending outboard lip when in a lowered orientation, whereby the elevation cylinder is adapted to raise and lower upon the reciprocation of the sleeve thereby elevating the vehicle;
   a jack arm having an L-shaped configuration with a first end with a tapered configuration and a second end with a socket mounted thereon, wherein the first end is adapted to be removably situated within an outboard end of the sleeve for manually reciprocating the same;
   a storage locking assembly including a first pair of vertical bores formed in the horizontal plate of the mounting bracket adjacent ends of the outboard edge thereof, a second pair of bores formed in the base of the elevation cylinder of the jack assembly adjacent ends of an outboard edge thereof, and a pair of bolts each having a length about equal to a height of the bottom extent of the elevation cylinder of the jack assembly for being coupled within the first and second pair of bores for maintaining the elevation cylinder in an upwardly extended orientation for storage purposes; and
   a deployed locking assembly including a first aperture formed in the elevation cylinder of the jack assembly at a top end thereof and a second aperture formed in the upper extent of cylindrical tube of the jack assembly adjacent to a top end thereof, a quick release pin removably situated within the first and second apertures for maintaining the elevation cylinder in a downwardly extended orientation during deployment.

2. A vehicular jack system comprising:
   a mounting bracket fixedly coupled to a frame of a vehicle, the mounting bracket including a base plate;
   a jack assembly connected to the mounting bracket for elevating the vehicle, the jack assembly including a storage locking assembly for selectively maintaining the jack assembly in a stored elevated orientation and a deployed locking assembly for selectively maintaining the jack assembly in a deployed lowered orientation; and manual elevation means for manually elevating the vehicle via the jack assembly;

wherein the storage locking assembly includes a first bore formed in the base plate of the mounting bracket a second bore formed in a base of the jack assembly, and a bolt removably inserted through the first and second bores for maintaining the distance between that base plate and the base of the jack assembly.

3. A vehicular jack system as set forth in claim 2 wherein the locking assembly includes two first bores in the base plate, two second bores in the base of the jack assembly, and two bolts.

4. A vehicular jack system as set forth in claim 2 wherein deployed locking assembly includes a first aperture formed in the elevation cylinder of the jack assembly and a second aperture formed in the tube of the jack assembly such that the first and second apertures are aligned when the elevation cylinder of the jack assembly is extended, and a quick release pin removably insertable in the first and second apertures for maintaining the elevation cylinder in an extended position during deployment of the jack assembly.

5. A vehicular jack system as set forth in claim 2 wherein the mounting bracket includes a slot for receiving a longitudinal frame bar of the vehicle.

6. A vehicular jack system as set forth in claim 5 wherein the mounting bracket is mounted to the vehicle by way of a plurality of screws.

7. A vehicular jack system as set forth in claim 2 wherein the manual elevation means includes a jack arm removably coupled to the jack assembly.

8. A vehicular jack system as set forth in claim 2 wherein the jack assembly is adapted to raise and lower by way of a reciprocation motion of the manual elevation means.

9. A vehicular jack system comprising:

a mounting bracket including a base plate with a periphery defined by an inboard edge, an outboard edge and a pair of side edges, the mounting bracket further including a pair of plates including a first plate coupled along the inboard edge of the base plate and extending upwardly from the base plate in perpendicular relationship therewith and a second plate coupled to the base plate and extending upwardly therefrom in perpendicular relationship with the base plate, the second plate being spaced from the first plate to define a slot for receiving a frame bar of a vehicle, wherein the mounting bracket is fixedly attached to the frame;

a jack assembly including a tube mounted to the base plate of the mounting bracket between the outboard edge and the second plate such that the tube extends both above and below the base plate of the mounting bracket to define an upper extent and a lower extent, the jack assembly further including an elevation cylinder slidably mounted in the tube and having a base mounted to a lower end thereof, the elevation cylinder having a plurality of vertically spaced notches formed therein;

a storage locking assembly including a first pair of bores formed in the base plate of the mounting bracket, a second pair of bores formed in the base of the elevation cylinder of the jack assembly, and a pair of bolts removably inserted through the first and second pair of bores for maintaining the elevation cylinder in a retracted position with respect to the tube for blocking extension of the elevation cylinder from the tube; and a deployed locking assembly including a first aperture formed in the elevation cylinder of the jack assembly and a second aperture formed in the tube of the jack assembly such that the first and second apertures are aligned when the elevation cylinder of the jack assembly is extended, a quick release pin removably insertable in the first and second apertures for maintaining the elevation cylinder in an extended position during deployment of the jack assembly.

10. The jack system of claim 9 wherein the jack assembly includes a control mechanism including a housing coupled to the lower extent of the tube, the housing having an open top and an upwardly extending outboard lip, whereby the elevation cylinder is adapted to raise and lower upon the reciprocation of the sleeve thereby elevating the vehicle.

11. The jack system of claim 10 wherein the control mechanism further includes a sleeve with an inboard end pivotally coupled within the housing about a horizontal axis wherein the sleeve has a vertical tab coupled to a bottom end thereof with a notch formed therein for removably receiving the upwardly extending outboard lip when in a lowered orientation.

12. The jack system of claim 9 additionally comprising a jack arm having an L-shaped configuration with a first end with a tapered configuration and a second end with a socket mounted thereon, wherein the first end is adapted to be removably situated within an outboard end of the sleeve for manually reciprocating the same.

13. A vehicular jack system comprising:

a mounting bracket fixedly coupled to a frame of a vehicle, the mounting bracket including a base plate;

a jack assembly connected to the mounting bracket for elevating the vehicle, the jack assembly including a storage locking assembly for selectively maintaining the jack assembly in a stored elevated orientation and a deployed locking assembly for selectively maintaining the jack assembly in a deployed lowered orientation; and manual elevation means for manually elevating the vehicle via the jack assembly;

wherein deployed locking assembly includes a first aperture formed in the elevation cylinder of the jack assembly and a second aperture formed in the tube of the jack assembly such that the first and second apertures are aligned when the elevation cylinder of the jack assembly is extended, and a quick release pin removably insertable in the first and second apertures for maintaining the elevation cylinder in an extended position during deployment of the jack assembly.

14. A vehicular jack system as set forth in claim 13 wherein the mounting bracket includes a slot for receiving a longitudinal frame bar of the vehicle.

15. A vehicular jack system as set forth in claim 14 wherein the mounting bracket is mounted to the vehicle by way of a plurality of screws.

16. A vehicular jack system as set forth in claim 13 wherein the manual elevation means includes a jack arm removably coupled to the jack assembly.

17. A vehicular jack system as set forth in claim 13 wherein the jack assembly is adapted to raise and lower by way of a reciprocation motion of the manual elevation means.

* * * * *